United States Patent [19]
Lepert

[11] 4,130,701
[45] Dec. 19, 1978

[54] PETROLEUM RESINS CONTAINING VINYL NORBORNENE OR TETRAHYDROINDENE

[75] Inventor: André Lepert, Rhode Saint Genese, Belgium

[73] Assignee: Exxon Research & Engineering Co., Florham Park, N.J.

[21] Appl. No.: 841,345

[22] Filed: Oct. 12, 1977

[30] Foreign Application Priority Data

Oct. 19, 1976 [GB] United Kingdom ............... 43305/76

[51] Int. Cl.$^2$ ........................... C08F 2/00; C08F 4/14; C08F 32/08; C08F 232/08
[52] U.S. Cl. ..................................... 526/76; 526/237; 526/280; 526/282
[58] Field of Search ................... 526/76, 280, 282, 290

[56] References Cited

U.S. PATENT DOCUMENTS

| 2,856,389 | 10/1958 | Fusco et al. | 526/280 |
| 3,379,663 | 4/1968 | Takei et al. | 526/290 |
| 3,753,963 | 8/1973 | Hayashi et al. | 526/280 |
| 3,799,913 | 3/1974 | Wheeler et al. | 526/280 |
| 3,855,187 | 12/1974 | Winkler et al. | 526/76 |
| 3,865,797 | 2/1975 | Joy | 526/76 |
| 3,880,820 | 4/1975 | Sato | 526/76 |
| 3,905,948 | 9/1975 | Vargiu et al. | 526/76 |
| 3,950,453 | 4/1976 | Ishiguro et al. | 526/290 |
| 3,987,123 | 10/1976 | Lepert | 526/76 |
| 4,068,062 | 1/1978 | Lepert | 526/76 |

Primary Examiner—Herbert J. Lilling

[57] ABSTRACT

A resin suitable as a tackifier is prepared by polymerizing using a Friedel Crafts catalyst:
(1) a petroleum resin feed comprising $C_5$ olefins and diolefins, $C_6$ olefins and diolefins or a mixture of $C_5$ and $C_6$ olefins and diolefins, said feed being obtained from the cracking of petroleum feedstock, and
(2) an additive comprising vinyl norbornene or tetrahydroindene.

The resin thus prepared may be mixed with a natural or synthetic rubber.

9 Claims, No Drawings

PETROLEUM RESINS CONTAINING VINYL NORBORNENE OR TETRAHYDROINDENE

This invention relates to petroleum resins suitable as tackifiers for elastomers or for hot melt applications.

It has been found that SIS block copolymers (block styrene-isoprene copolymers such as Shell Cariflex TR 1107) can be tackified by petroleum resins of narrow molecular weight distribution and low softening point produced by controlling the polymerization conditions with branched reactive olefins, substituted aromatics or tertiary alkyl halides, see for example, my prior U.S. Pat. Nos. 4,068,062 and 4,078,132. These previously described petroleum resins of narrow molecular weight distribution have good wax compatibility, flexibility and low viscosity. They tackify oil extended random SBR (styrenebutadiene) copolymers and provide very good tackifying properties for the SIS block copolymers. However, they have a low cohesive strength in pressure sensitive adhesives based on natural rubber. They do not tackify oil free SBR elastomers of either random or block thermoplastic nature (e.g., SBS block copolymers).

Other petroleum feed additives, for example dicyclopentadiene (DCPD), methyl cyclopentadiene dimers or thermal polymers obtained from cyclodiene dimer-rich streams as described in U.S. Pat. No. 3,987,123 are known as a means of making resins of high softening point. However, the resins produced in this way have degraded resin Gardner color and wax compatibility. Moreover, although they increase the cohesive strength of pressure sensitive adhesives based on natural rubbers and slightly tackify SIS block copolymers, they do not tackify other SBR copolymers.

Other additives such as cyclopentene, terpenes, vinyl cyclohexene and some unsaturated aromatics have been used in the past but they are expensive or difficult to synthesise if not available from the petroleum industry as crude or refined streams. (See for example German Pat. No. 2350692 and Belgian Pat. No. 790210).

Japanese 49/030489 discloses the polymerization using a Lewis acid catalyst of petroleum fractions with an unsaturated alicyclic compound containing more than six carbon atoms per molecule. Such alicyclics include norbornene and cycloheptene. The resins thereby produced are not as polar and hence as reactive as resins produced using vinyl norbornene or tetrahydroindene in accordance with the process of this invention.

We have now found additives which, when polymerized with certain petroleum resin feeds, produce reactive resins which tackify substantially natural and synthetic rubbers including SIS block thermoplastic elastomers and natural rubber. Also, the resins produced do not suffer any significant degradation of the resin Gardner color and they have good wax compatibility. Additionally, high resin yields are obtained from the polymerization process.

According to this invention modified resins suitable as tackifiers are obtained by a process which comprises polymerizing using a Friedel Crafts catalyst (1) a petroleum resin feed comprising $C_5$ olefins and diolefins, $C_6$ olefins and diolefins or a mixture of $C_5$ and $C_6$ olefins and diolefins, said feed being obtained from the cracking of petroleum feedstock, and (2) an additive comprising a non-aromatic cyclic compound, said compound being vinyl norbornene or tetrahydroindene. The additive may in addition contain a cotrimer of cyclopentadiene (CPD) or methylcyclopentadiene (MeCPD) with a $C_5$ conjugated diene.

The $C_5$ or $C_6$ diolefin- and olefin-containing feed is obtained from the cracking of petroleum feedstock. Such feedstocks include naphthas, kerosene, gas oil and vacuum gas oil. These feedstock usually boil in a range of from 20° C. to 450° C.

The petroleum feedstock is cracked, preferably in the presence of steam, and the recommended cracking temperature is between 500° and 870° C. The product, which contains unsaturated hydrocarbons usually boiling in the range of 20° to 240° C., preferably 20° to 130° C., usually is thereafter subjected to fractionation to remove $C_2$ to $C_4$ light ends. The feedstock may thereafter be subjected to thermal soaking at a temperature of between 100° C. and 160° C., preferably 120° to 140° C., e.g. at about 130° C. The thermal soaking preferably takes 0.5 to 6 hours, e.g. 0.5 to 1 hour. Low temperatures are preferred in order to limit the cyclic diene (CPD and MeCPD) co-dimerization with $C_5$ linear conjugated dienes (isoprene and 1,3 cis- and trans-pentadienes. After fractionation and if carried out thermal soaking, the feedstock is preferably subjected to distillation to remove cyclic conjugated diolefins which are gel precursors (cyclopentadiene and methylcyclopentadiene being removed as dimers).

After distillation one obtains an overhead naphtha which usually boils from 25° to 110° C.; e.g., 25° to 80° C., the best results being achieved with a 25°-70° C. cut. This overhead naphtha comprises mainly $C_5$ diolefins such as isoprene and 1,3 cis- and trans- pentadienes, $C_5$ to $C_6$ monoolefins and aromatics, for example benzene. In general the overhead naphthas have the following compositions which obviously depend on the nature of the petroleum feedstock which is subjected to steam cracking:

|  | % by weight |
| --- | --- |
| Total paraffins | 1.0 to 41.5 |
| Total diolefins | 35.5 to 14.5 |
| Total olefins | 33.5 to 13.0 |
| Total aromatics | 30.0 to 31.0 |
| Isoprene | 16.5 to 6.5 |
| Pentadiene 1,3 | 14.5 to 4.5 |
| Cyclopentadiene | 1.0 to 2.5 |

The feed could be significantly isoprene-free provided this compound is previously recovered through any conventional extraction process such as extractive distillation or azeotropic distillation. In such cases the properties of the resins produced are better than those obtained with isorpene-containing feeds. Moreover, depending on the final boiling point of the feed cut, the feedstock could be substantially free of benzene. Cyclopentene contents are generally below 3.0 wt.%.

If thermal soaking has been carried out the cyclodiene dimers which are produced are generally not included in the feed to be polymerized, because they are detrimental to the specific properties of the resins. However, if required for special applications they can be left in the resin feed, the distillation step previously mentioned being carried out before the thermal soaking step.

The additive is a specified non-aromatic cyclic compound, i.e. vinyl norbornene or tetrahydroindene. The cotrimer which may also be included is a cotrimer of cyclopentadiene or of methylcyclopentadiene with a C₅ conjugated diene, for example isoprene and/or 1,3 cis- and trans- pentadienes. These cotrimers which comprise many isomers are usually prepared by a thermal Diels-Alder condensation carried out by reacting CPD or MeCPD with the C₅ conjugated diene at between 200° and 300° C., e.g., 260° C. for about 2 hours. The liquid fraction recovered by distillation consists mainly of the following products:

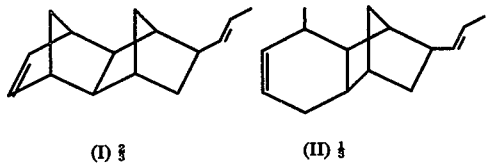

(I)   (II)

The amount of additive which is polymerized with the feed usually varies from 5 to 50 wt.%, e.g. 10 to 40 wt.% based on the weight of petroleum resin feed.

The petroleum resin feed and additive are mixed and polymerized using a Friedel Crafts catalyst, for example aluminum chloride, aluminum bromide or a liquid aluminum chloride/hydrochloric acid/alkyl substituted aromatic hydrocarbon complex, the aromatic hydrocarbon being for example o-xylene, mesitylene, ethyl benzene, isopropyl benzene or other short or long chain alkyl benzenes. The alkyl chain can be linear or branched and can vary from 1 to 30 carbon atoms.

Acid liquid AlCl₃ sludges obtained as by-products during the alkylation of benzene or any other substituted aromatics (e.g. toluene or xylenes) with branched chain olefins can be directly used as catalyst for the above described polymerisation process. The branched chain olefins which are for example, produced via the boron trifluoride oligomerisation of propylene and fractionation, e.g. C₁₂ olefins or C₂₄ olefins, can be used to alkylate aromatics, producing in situ sludge. As an example the acidic sludge available for a dodecylbenzene plant provided results similar to the preformed o-xylene/AlCl₃/HCl liquid complex.

These liquid complexes are slightly more efficient than AlCl₃ powder at equivalent concentration and provide slightly higher resin yields and lower resin molecular weight. Therefore, the amount of feed additive required for narrowing the resin molecular weight is significantly reduced. Moreover, when by-product sludges are available in plant site, the catalyst cost is reduced and such a process is particularly attractive.

In the polymerisation process the amount of catalyst may vary from 0.25 to 3.0 wt.% preferably 0.5 to 1.5 wt.% based on the weight of the mixture to be polymerized. The optimum concentration depends on the nature of the solvent which affects the solubility of the catalyst as well as on the stirring efficiency inside the polymerization reactor. High catalyst concentration reduces the resin molecular weight distribution and therefore limits the amount of feed additive required for controlling the resin molecular weight.

Other Friedel Crafts catalysts like titanium tri- or tetrachloride, tin tetrachloride, boron trifluoride, boron trifluoride complexes with organic ethers, phenols or acids can also be used but they lead to rather low resin yields and large quantities of liquid oligomers of low value are obtained. Even though these oily oligomers can be upgraded as reactive plasticizer or liquid plasticizer, such catalysts are not recommended. Other possible catalysts can be acidic clays.

Usual polymerization temperatures are between −20° C. and 100° C., preferably between 30° and 80° C.

After polymerization the residual catalyst may be removed by for example washing with aqueous solution of alkali, ammonia or sodium carbonate, or by the addition of an alcohol such as methanol and subsequent filtration.

The final resin may be stripped of unreacted hydrocarbons ("raffinate" rich in benzene and/or paraffins/unreactive olefins) and low molecular weight oil oligomers by steam stripping or vacuum distillation. The finished product is a substantially non-aromatic unsaturated thermoplastic hydrocarbon resin. It usually has a softening point of from 20° to 140° C., preferably 70° to 120° C., or better 70°–100° C.

The resins thus obtained have higher unsaturation than would be the case if the additive (2) had not been used. This means that the resins have enhanced reactivity through conventional chemical reactions with olefinic double bonds (e.g. epoxidation, "ene reaction" such as reaction with maleic anhydride or unsaturated acids, esterification, Koch reaction, hydroformylation, copolymerisation with free radical sensitive monomers, alkylation with phenols or grafting).

The introduction of pendant side chain unsaturation in the polymers by the vinyl norbornene or cotrimer addition process is therefore particularly attractive and will enable the manufacture of polar petroleum resins. Some reactivity will also be introduced when using tetrahydroindene by total unsaturation increase.

The resin softening point increases obtained from the use of these additives allow the addition of either unsaturated or aromatic monomers (e.g. styrene, α-methyl styrene, vinyl toluene, vinylcyclohexene, dipentene, cyclopentene or indene) or feed additives which control the resin molecular weight distribution, for example those described in my U.S. Pat. Nos. 4,068,062 (a tertiary hydrocarbyl halide) and U.S. Pat. No. 4,078,132 (a U.O.P. olefin, diisobutene or an oxygenated transfer agent such as a C₁ to C₃₀ hydrocarbyl substituted phenol, an alcohol or an ester). As disclosed in the latter patent, U.O.P. olefins are branched chain olefins where the chain length varies from 4 to 30 carbon atoms, preferably from 5 to 9 carbon atoms per molecule. U.O.P. olefins are manufactured by oligomerization of propylene with an acidic catalyst like phosphoric acid and recovered by fractionation. They have an extremely highly branched structure. Di-isobutene can be a pure component or preferably a steam cracked petroleum derivative obtained by isobutene extraction with sulphuric acid and recovered as the dimer by thermal decomposition of the corresponding organic sulphate. The di-isobutene concentrate contains the isobutene dimers such as 2,2,4 trimethyl-2-pentene and 2,2,4 trimethyl-1-pentene but also a significant amount of isobutene trimers. These feed additives are added to the feed before polymerization occurs. In this way it is possible to make resins of satisfactory overall properties such as excellent initial Gardner color and heat stability, good compatibility and adequate tackifying properties for all natural and synthetic rubbers, especially thermoplastic elastomers such as SIS or SBS block copolymers which are particularly recommended for pressure sensitive adhesives and hot melt adhesives.

The aromatic-free resins obtained can be used in many applications which require low viscosity, good flexibility and elongation before or especially after chemical modification with polar compounds such as phenols, unsaturated anhydrides such as maleic anhydride or unsaturated acids, e.g. fumaric acid. These resins are designed for a wide range of end uses and applications. They can be applied on paper, metal, thermoplastic films, (cellophane, polyesters, PVC) woven or non woven fabrics, glass etc. and for bonding such materials together. Typical applications are in hot melts, carpet backing, coatings with drying oil formulations, book or for binding, paper sizing or in any applications involving natural or synthetic resin and/or rubbers such as caulks, sealants or for rubber tackification. More especially their use as elastomer tackifier is important with natural rubber or synthetic rubbers such as polyisoprene, EPDM, butyl, chorobutyl, bromobutyl, neoprene and block copolymers for example styrene/isoprene rubber (Shell Cariflex TR 1107) or the like or their mixtures. Even though these resins are significantly non-aromatic they provide outstanding tackiness with such elastomers and high resin/rubber ratio can be used, thus reducing the adhesive formulation cost (the resin being significantly cheaper than the block styrene/isoprene rubber).

Other applications involving such resin properties are for pressure sensitive adhesives, hot melt adhesives, low temperature adhesives, label adhesives, latex adhesives, surgical tapes and masking tapes.

Thus, hot melt adhesives and latex adhesives can be prepared from styrene - isoprene block copolymers and a tackifying resin. The low softening point aliphatic petroleum resins are a replacement for aromatic resins or rosin and terpene derivatives. In the hot melt adhesive the formulations can be prepared by mixing the thermoplastic rubber and the petroleum resin at 150° C. Latex adhesives can be prepared by emulsifying in water the thermoplastic rubber or an oil extended thermoplastic rubber (block styrene -isoprene copolymer) with the petroleum resin in the presence of a diluted solution of a soap such as rosin salt.

When used in natural or synthetic rubber formulations the resins of this invention can provide excellent tackifying properties without the assistance of oil extenders. For example the resin can be used in inner tube formulations where the presence of oil would reduce drastically the rubber impermeability. Usually the amount of the resin produced by the process of this invention which is mixed with the rubber in such applications is 65 to 250 phr., e.g. 100 to 175 phr.

In the Tables which follow the polymers made from the resin feed alone are compared with polymers made in accordance with the invention (Table 3 — Runs 2 and 3 and Table 5 Runs 2 and 3) and with polymers made with additives other than those specified in this invention. Also the pressure sensitive adhesive properties using different rubbers are compared.

In all these cases the feed was a steam cracked feedstock of boiling point 25°-70° C., using 20 wt.% benzene as solvent the composition being:

| Paraffins | 2.30 wt.% | |
|---|---|---|
| $C_5$ and $C_6$ dienes | 43.00 wt.% | + 30 wt.% benzene |
| $C_5$ and $C_6$ olefins | 47.00 wt.% | as solvent |
| Benzene | 7.70 wt.% | |

| Typical $C_5$ Dienes | |
|---|---|
| Isoprene | 19.50 wt.% |
| Pentadiene 1,3 trans | 10.90 wt.% |
| Pentadiene 1.3 cis | 6.30 wt.% |
| Cyclopentadiene | 2.10 wt.% |

| Typical $C_6$ Olefins | |
|---|---|
| 2 Methyl Butene-1 | 7.95 wt.% |
| 2 Methyl Butene-2 | 8.50 wt.% |
| Pentene-1 | 7.85 wt.% |
| Cyclopentene | 3.65 wt.% |

The feed, which was obtained from the cracking of petroleum feedstock, had been thermally soaked at a temperature of 135° C. for about 1 hour.

TR 1107 and TR 1102 are Shell Cariflex thermoplastic SIS (styreneisoprene) and SBS (styrene-butadiene) block copolymers respectively. EVA 250 is Elvax Du Pont ethylene-vinyl acetate copolymer.

The catalyst used in each case was $AlCl_3$ powder at a concentration of 0.75 wt.% based on the total feed including additives and solvent.

From these Tables it can be seen that resins made by the process of this invention show superior properties as regards initial Gardner color, softening point, wax compatibility and pressure sensitive adhesive properties. They are also obtained in better yield than in most of the prior art processes.

All the resin samples produced according to the invention are characterized by rather high softening point and are particularly suitable for the manufacture of printing inks and for improving the cohesive strength (shear measurement) of pressure sensitive adhesives.

TABLE 1

| | | | | | | |
|---|---|---|---|---|---|---|
| Feed (wt %) | 70 | | 60 | | 50 | |
| Additive nature | — | | Cyclopentene | | Cyclopentene | |
| Additive (wt %) | 0 | | 10 | | 20 | |
| Benzene (wt %) | 30 | | 30 | | 30 | |
| Resin Yield (wt %) on total feed | 39.5 | | 35.1 | | 31.2 | |
| Gardner colour (50 wt % in toluene) | 3+ | | 4⁻ | | 5 | |
| Softening point ° C | 97.5 | | 97 | | 95 | |
| Gardner colour after heating 16 hr at 150° C | 13⁻ | | 12 | | 12⁻ | |
| Molecular weight (Mn) | 2020 | | 1460 | | 1350 | |
| Iodine number | 153 | | 158 | | 159 | |
| Viscosity in solution cps at 25° C (60 wt % in toluene) | 140 | | 75 | | 58 | |
| Pressure sensitive adhesive properties | | | | | | |
| Natural rubber | X | | X | | X | |
| Block copolymer TR 1107 | | X | | X | | X |
| Resin rubber ratio -phr | 100 | 67 | 100 | 67 | 100 | 67 |
| 180° Peel strength (grams/25 mm) | 590 | 950 | 870 | 1630 | 974 | 1608 |
| PolyKen tack (grams) | 50 | 0 | 725 | 700 | 750 | 900 |
| Tack Rolling Ball method (cm) | >30 | >30 | 8 | 7 | 3 | 5 |
| Shear on paper (hr to failure) | 5 | 150 | 10 | >6 weeks | 2 | >6 weeks |

TABLE 1-continued

| Wax cloud point ° C | | | |
|---|---|---|---|
| Wax*/EVA250/resin wt % | 135 | 80 | <65 |
| 70/15/15 wt % | | | |
| 60/20/20 wt % | | | 72 |

*65° C melting point

TABLE 2

| Feed (wt %) | 70 | | 60 | | 50 | |
|---|---|---|---|---|---|---|
| Additive nature | — | | 4-Vinyl 1-cyclohexene | | 4-Vinyl 1-cyclohexene | |
| Additive (wt %) | 0 | | 10 | | 20 | |
| Benzene (wt %) | 30 | | 30 | | 30 | |
| Resin Yield (wt %) on total feed | 39.5 | | 31.9 | | 31.5 | |
| Gardner colour (50 wt % in toluene) | 3+ | | 5 | | 5+ | |
| Softening point ° C | 97.5 | | 100 | | 109 | |
| Gardner colour after heating 16 hr at 150° C | 13⁻ | | 13⁻ | | 12 | |
| Molecular weight ($\overline{Mn}$) | 2020 | | 1955 | | 1675 | |
| Iodine number | 153 | | 152 | | 153 | |
| Viscosity in solution cps at 25° C (60 wt % in toluene) | 140 | | 134 | | 109 | |
| Pressure sensitive adhesive properties | | | | | | |
| Natural rubber | X | | X | | X | |
| Block copolymer TR 1107 | | X | | X | | X |
| Resin rubber ratio - phr | 100 | 67 | 100 | 67 | 100 | 67 |
| 180° Peel strength (grams/25 mm) | 590 | 950 | 665 | 1450 | 665 | 1700 |
| PolyKen tack (grams) | 50 | 0 | 500 | 500 | 125 | 700 |
| Tack Rolling Ball method (cm) | >30 | >30 | >30 | 8.5 | >30 | 7.5 |
| Shear on paper (hr to failure) | 5 | 150 | 10 | >6 weeks | 60 | >6 weeks |
| Wax cloud point ° C | | | | | | |
| Wax/EVA250/resin wt % 70/15/15 wt % | 135 | | 110 | | 94 | |

TABLE 3

| Feed (wt %) | 70 | | 60 | | 50 | |
|---|---|---|---|---|---|---|
| Additive nature | — | | Vinyl-norbornene | | Vinyl-norbornene | |
| Additive (wt %) | 0 | | 10 | | 20 | |
| Benzene (wt %) | 30 | | 30 | | 30 | |
| Resin Yield (wt %) on total feed | 39.5 | | 33.9 | | 38.1 | |
| Gardner colour (50 wt % in toluene) | 3+ | | 5+ | | 5+ | |
| Softening point ° C | 97.5 | | 117 | | 138 | |
| Gardner colour after heating 16 hr at 150° C | 13⁻ | | 13 | | 8+ | |
| Molecular weight ($\overline{Mn}$) | 2020 | | 2280 | | 2565 | |
| Iodine number | 153 | | 166 | | 162 | |
| Viscosity in solution cps at 25° C (60 wt % in toluene) | | | | | | |
| Pressure sensitive adhesive properties | | | | | | |
| Natural rubber | X | | X | | X | |
| Block copolymer TR 1107 | | X | | X | | X |
| Resin rubber ratio - phr | 100 | 67 | 100 | 67 | 100 | 67 |
| 180° Peel strength (grams/25 mm) | 590 | 950 | 793 | 1245 | 860 | 1405 |
| PolyKen tack (grams) | 50 | 0 | 600 | 500 | 250 | 550 |
| Tack Rolling Ball method (cm) | >30 | >30 | 13.5 | 8 | 15 | 6.5 |
| Shear on paper (hr to failure) | 5 | 150 | 4 | >6 weeks | 55 | >6 weeks |
| Wax cloud point ° C | | | | | | |
| Wax/EVA250/resin wt % 70/15/15 wt % | 135 | | 200 | | >250 | |

TABLE 4

| Feed (wt %) | 70 | | 60 | | 50 | |
|---|---|---|---|---|---|---|
| Additive nature | — | | Norbornene | | Norbornene | |
| Additive (wt %) | 0 | | 10 | | 20 | |
| Benzene (wt %) | 30 | | 30 | | 30 | |
| Resin Yield (wt %) on total feed | 39.5 | | 39.3 | | 37.5 | |
| Gardner colour (50 wt % in toluene) | 3+ | | 3+ | | 4⁻ | |
| Softening point ° C | 97.5 | | 105 | | 108 | |
| Gardner colour after heating 16 hr at 150° C | 13⁻ | | 12 | | 12⁻ | |
| Molecular weight ($\overline{Mn}$) | 2020 | | 1365 | | 1160 | |
| Iodine number | 153 | | 136 | | 128 | |
| Viscosity in solution cps at 25° C (60 wt % in toluene) | 140 | | 76 | | 49 | |
| Pressure sensitive adhesive properties | | | | | | |
| Natural rubber | X | | X | | X | |
| Block copolymer TR 1107 | | X | | X | | X |
| Resin rubber ratio -phr | 100 | 67 | 100 | 67 | 100 | 67 |

TABLE 4-continued

| | | | | | | |
|---|---|---|---|---|---|---|
| 180° Peel strength (grams/25 mm) | 590 | 950 | 950 | 1630 | 997 | 1948 |
| PolyKen tack (grams) | 50 | 0 | 800 | 1100 | 900 | 1050 |
| Tack Rolling Ball method (cm) | >30 | >30 | 7 | 4 | 3 | 2.5 |
| Shear on paper (hr to failure) | 5 | 150 | 3 | >6 weeks | 3 | >6 weeks |
| Wax cloud point ° C | | | | | | |
| Wax/EVA250/resin  wt % | | | | | | |
| 70/15/15  wt % | 135 | | 67 | | <65 | |
| 60/20/20  wt % | | | 78 | | <65 | |
| 50/25/25  wt % | | | | | <65 | |

TABLE 5

| | | | |
|---|---|---|---|
| Feed (wt %) | 70 | 60 | 50 |
| Additive nature | — | Tetrahydro-indene | Tetrahydro-indene |
| Additive (wt %) | 0 | 10 | 20 |
| Benzene (wt %) | 30 | 30 | 30 |
| Resin Yield (wt %) on total feed | 39.5 | 33.4 | 40.0 |
| Gardner colour (50 wt % in toluene) | 3+ | 5 | 5+ |
| Softening point ° C | 97.5 | 108 | 131 |
| Gardner colour after heating 16 hr at 150° C | 13− | 14− | with insolubles 11− |
| Molecular weight (Mn) | 2020 | 1685 | 1435 |
| Iodine number | 153 | 153 | 159 |
| Viscosity in solution cps at 25° C (60 wt % in toluene) | 140 | 123 | 132 |
| Pressure sensitive adhesive properties | | | |
| Natural rubber | X | X | X |
| Block copolymer TR 1107 | X | X | X |
| Resin rubber ratio - phr | 100  67 | 100  67 | 100  67 |
| 180° Peel strength (grams/25 mm) | 590  950 | 960  1495 | 838  1450 |
| PolyKen tack (grams) | 50  0 | 700  700 | 450  700 |
| Tack Rolling Ball method (cm) | >30  >30 | 10  7 | 11  3 |
| Shear on paper (hr to failure) | 5  150 | 7  >6 weeks | 7  >6 weeks |
| Wax cloud point ° C | | | |
| Wax/EVA250/resin  wt % | | | |
| 70/15/15  wt % | 135 | 82 | 104 |

TABLE 6

| | | | |
|---|---|---|---|
| Feed (wt %) | 70 | 60 | 50 |
| Additive nature | — | DCPD | DCPD |
| Additive (wt %) | 0 | 10 | 20 |
| Benzene (wt %) | 30 | 30 | 30 |
| Resin Yield (wt %) on total feed | 39.5 | 35.0 | 33.4 |
| Gardner colour (50 wt % in toluene) | 3+ | 7− | 6+ |
| Softening point ° C | 97.5 | 131 | 149 |
| Gardner colour after heating 16 hr at 150° C | 13− | (with insolubles) 11− | 7+ |
| Molecular weight (Mn) | 2020 | 2110 | 2170 |
| Iodine number | 153 | 153 | |
| Viscosity in solution cps at 25° C (60 wt % in toluene) | 140 | 343 | 815 |
| Pressure sensitive adhesive properties | | | |
| Natural rubber | X | X | X |
| Block copolymer TR 1107 | X | X | X |
| Resin rubber ratio - phr | 100  67 | 100  67 | 100  67 |
| 180° Peel strength (grams/25 mm) | 590  950 | 643  1472 | 657  1087 |
| PolyKen tack (grams) | 50  0 | 75  600 | 0  650 |
| Tack Rolling Ball method (cm) | >30  >30 | >30  10.5 | >30  5 |
| Shear on paper (hr to failure) | 5  150 | 10  >6 weeks | 16  >6 weeks |
| Wax cloud point ° C | | | |
| Wax/EVA250/resin  wt % | | | |
| 70/15/15  wt % | 135 | 240 | >250 |

TABLE 7

| | | | |
|---|---|---|---|
| Feed (wt %) | 70 | 60 | 50 |
| Additive nature | — | CPD/C$_5$ conjugated diolefin cotrimers | CPD/C$_5$ conjugated diolefin cotrimers |
| Additive (wt %) | 0 | 10 | 20 |
| Benzene (wt %) | 30 | 30 | 30 |
| Resin Yield (wt %) on total feed | 39.5 | 37.4 | 37.3 |
| Gardner colour (50 wt % in toluene) | 3+ | 5+ | 5.5 |
| Softening point ° C | 97.5 | 118 | 136 |
| Gardner colour after heating 16 hr at 150° C | 13− | 13.5 | (with insolubles) 9− |
| Molecular weight (Mn) | 2020 | 1915 | |
| Iodine number | 153 | 153 | 158 |
| Viscosity in solution cps at 25° C | | | |

TABLE 7-continued

|  |  |  |  |  |  |  |
|---|---|---|---|---|---|---|
| (60 wt % in toluene) | 140 |  | 235 |  |  |  |
| Pressure sensitive adhesive properties |  |  |  |  |  |  |
| Natural rubber | X |  | X |  | X |  |
| Block copolymer TR 1107 |  | X |  | X |  | X |
| Resin rubber ratio - phr | 100 | 67 | 100 | 67 | 100 | 67 |
| 180° Peel strength (grams/25 mm) | 590 | 950 | 1065 | 1835 | 1042 |  |
| PolyKen tack (grams) | 50 | 0 | 500 | 175 | 500 |  |
| Tack Rolling Ball method (cm) | >30 | >30 | >30 | >30 | >30 |  |
| Shear on paper (hr to failure) | 5 | 150 | 5 |  | 9 |  |
| Wax cloud point °C |  |  |  |  |  |  |
| Wax/EVA250/resin  wt % |  |  |  |  |  |  |
| 70/15/15  wt % | 135 |  | 140 |  |  |  |
| 60/20/20  wt % |  |  | >250 |  | >250 |  |

TABLE 8

|  |  |  |  |  |  |
|---|---|---|---|---|---|
| Feed (wt %) | 70 | 60 |  | 50 |  |
| Additive nature | — | Dipentene |  | Dipentene |  |
| Additive (wt %) | 0 | 10 |  | 20 |  |
| Benzene (wt %) | 30 | 30 |  | 30 |  |
| Resin Yield (wt %) on total feed | 39.5 | 37.8 |  | 35.4 |  |
| Gardner colour (50 wt % in toluene) | 3+ | 3+ |  | 4− |  |
| Softening point °C | 97.5 | 102 |  | 101 |  |
| Gardner colour after heating 16 hr at 150° C | 13− | 13.5 |  | 12+ |  |
| Molecular weight (Mn) | 2020 | 1385 |  | 1225 |  |
| Iodine number | 153 | 141 |  | 158 |  |
| Viscosity in solution cps at 25° C (60 wt % in toluene) | 140 | 57 |  | 50 |  |
| Pressure sensitive adhesive properties |  |  |  |  |  |
| Natural rubber | X | X |  | X |  |
| Block copolymer TR 1107 |  | X |  | X | X |
| Resin rubber ratio - phr | 100 | 67 | 100 | 67 | 100 | 67 |
| 180° Peel strength (grams/25 mm) | 590 | 950 | 950 | 1835 | 950 | 1993 |
| PolyKen tack (grams) | 50 | 0 | 800 | 1100 | 850 | 1100 |
| Tack Rolling Ball method (cm) | >30 | >30 | 5.5 | 3 | 4 | 2 |
| Shear on paper (hr to failure) | 5 | 150 | 2.5 | >6 weeks | 4 | >6 weeks |
| Wax cloud point °C |  |  |  |  |  |  |
| Wax/EVA250/resin  wt % |  |  |  |  |  |  |
| 70/15/15  wt % | 135 | <65 |  | <65 |  |
| 60/20/20  wt % |  | 70 |  |  |  |
| 50/25/25  wt % |  |  |  | <65 |  |
|  |  |  |  | 70 |  |

TABLE 9

|  |  |  |  |  |  |  |
|---|---|---|---|---|---|---|
| Feed (wt %) | 70 | 60 |  | 50 |  |  |
| Additive nature | — | styrene |  | styrene |  |  |
| Additive (wt %) | 0 | 10 |  | 20 |  |  |
| Benzene (wt %) | 30 | 30 |  | 30 |  |  |
| Resin Yield (wt %) on total feed | 39.5 | 42.2 |  | 49.5 |  |  |
| Gardner colour (50 wt % in toluene) | 3+ | 3− |  | 4− |  |  |
| Softening point °C | 97.5 | 89 |  | 90 |  |  |
| Gardner colour after heating 16 hr at 150° C | 13− | 13+ |  | 12− |  |  |
| Molecular weight (Mn) | 2020 | 1360 |  | 1220 |  |  |
| Iodine number | 153 | 132 |  | 101 |  |  |
| Viscosity in solution cps at 25° C (60 wt % in toluene) | 140 | 58 |  | 53 |  |  |
| Pressure sensitive adhesive properties |  |  |  |  |  |  |
| Natural rubber | X |  | X |  | X |  |
| Block copolymer TR 1107 |  | X |  | X |  | X |
| TR 1102 |  | X |  | X |  | X |
| Resin rubber ratio - phr | 100 | 67 | 100 | 67 | 100 | 67 |
|  |  | 67 |  | 67 |  | 67 |
| 180° Peel strength (grams/25 mm) | 590 | 950 | 1028 | 2084 | 1020 | 1857 |
|  |  | 135 |  | 938 |  | 1450 |
| PolyKen tack (grams) | 50 | 0 | 950 | 1150 | 875 | 1250 |
|  |  | 0 |  | 75 |  | 900 |
| Tack Rolling Ball method (cm) | >30 | >30 | 1.5 | 1 | 1.5 | 1 |
|  |  | >30 |  | >30 |  | 4.5 |
| Shear on paper (hr to failure) | 5 | 150 | 1.5 | >6 weeks | 1.5 | >6 weeks |
|  |  |  |  | >290 |  | >290 |
| Wax cloud point °C |  |  |  |  |  |  |
| Wax/EVA250/resin  wt % |  |  |  |  |  |  |
| 70/15/15  wt % | 135 | <65 |  | <65 |  |  |
| 60/20/20  wt % |  | <65 |  | <65 |  |  |
| 50/25/25  wt % |  | <65 |  | <65 |  |  |
| 40/30/30  wt % |  | <65 |  | <65 |  |  |
| 40/40/20  wt % |  | <65 |  | <64 |  |  |

TABLE 10

| Feed (wt %) | 70 | | 60 | | 50 | |
|---|---|---|---|---|---|---|
| Additive nature | — | | α-methyl styrene | | | |
| Additive (wt %) | 0 | | 10 | | 20 | |
| Benzene (wt %) | 30 | | 30 | | 30 | |
| Resin Yield (wt %) on total feed | 39.5 | | 41.8 | | 42.6 | |
| Gardner colour (50 wt % in toluene) | 3+ | | 3+ | | 4 | |
| Softening point ° C | 97.5 | | 87 | | 79 | |
| Gardner colour after heating 16 hr at 150° C | 13− | | 13+ | | 13− | |
| Molecular weight (Mn) | 2020 | | 1230 | | 945 | |
| Iodine number | 153 | | 132 | | 106 | |
| Viscosity in solution cps at 25° C (60 wt in toluene) | 140 | | 45 | | 28 | |
| Pressure sensitive adhesive properties | | | | | | |
| Natural rubber | X | | X | | X | |
| Block copolymer TR 1107 | | X | | X | | X |
| TR 1102 | | X | | X | | X |
| Resin rubber ratio - phr | 100 | 67 67 | 100 | 67 67 | 100 | 67 67 |
| 180° Peel strength (grams/25 mm) | 590 | 950 135 | 938 | 1902 1074 | 930 | 2.015 1225 |
| PolyKen tack (grams) | 50 | 0 0 | 900 | 1200 325 | 775 | 1206 1175 |
| Tack Rolling Ball method (cm) | >30 | >30 >30 | 1.5 | 1 12 | 1.5 | 1 16 |
| Shear on paper (hr to failure) | 5 | 150 0 | 2 | 27 days >290 | 1.5 | 150 71 |
| Wax cloud point ° C | | | | | | |
| Wax/EVA250/resin wt % | | | | | | |
| 70/15/15 wt % | 135 | | | | | |
| 60/20/20 wt % | | | | | | |
| 50/25/25 wt % | | | <65 | | <65 | |
| 40/30/30 wt % | | | <65 | | <65 | |
| 40/40/20 wt % | | | <65 | | <65 | |

TABLE 11

| Feed (wt %) | 70 | | 60 | | 50 | |
|---|---|---|---|---|---|---|
| Additive nature | — | | vinyl toluene | | vinyl toluene | |
| Additive (wt %) | 0 | | 10 | | 20 | |
| Benzene (wt %) | 30 | | 30 | | 30 | |
| Resin Yield (wt %) on total feed | 39.5 | | 43.0 | | 46.2 | |
| Gardner colour (50 wt % in toluene) | 3+ | | 3+ | | 3+ | |
| Softening point ° C | 97.5 | | 87 | | 87 | |
| Gardner colour after heating 16 hr at 150° C | 13− | | 13 | | 12− | |
| Molecular weight (Mn) | 2020 | | 1230 | | 1085 | |
| Iodine number | 153 | | 130 | | 104 | |
| Viscosity in solution cps at 25° C (60 wt % in toluene) | 140 | | 50 | | 42 | |
| Pressure sensitive adhesive properties | | | | | | |
| Natural rubber | X | | X | | X | |
| Block copolymer TR 1107 | | X | | X | | X |
| TR 1102 | | X | | X | | X |
| Resin rubber ratio - phr | 100 | 67 67 | 100 | 67 67 | 100 | 67 67 |
| 180° Peel strength (grams/25 mm) | 590 | 950 135 | 1110 | 1720 1472 | 1020 | 1335 1460 |
| PolyKen tack (grams) | 50 | 0 0 | 900 | 1050 675 | 1000 | 1100 1075 |
| Tack Rolling Ball method (cm) | >30 | >30 >30 | 1.5 | 1 8 | 1.5 | 1 2 |
| Shear on paper (hr to failure) | 5 | 0 | 2 | >6 weeks >290 | 2 | 32 days >290 |
| Wax cloud point ° C | | | | | | |
| Wax/EVA250/resin wt % | | | | | | |
| 70/15/15 wt % | 135 | | | | | |
| 60/20/20 wt % | | | | | | |
| 50/25/25 wt % | | | | | | |
| 40/30/30 wt % | | | <65 | | <65 | |
| 40/40/20 wt % | | | <65 | | <65 | |

TABLE 12

| Feed (wt %) | 70 | 60 | 50 |
|---|---|---|---|
| Additive nature | — | Indene | Indene |
| Additive (wt %) | 0 | 10 | 20 |
| Benzene (wt %) | 30 | 30 | 30 |
| Resin Yield (wt %) on total feed | 39.5 | 37.5 | 33.1 |
| Gardner colour (50 wt % in toluene) | 3+ | 5 | 6+ |
| Softening point ° C | 97.5 | 108 | 116 |
| Gardner colour after heating 16 hr at 150° C | 13− | 14− | 14+ |
| Molecular weight (Mn) | 2020 | 1760 | 1810 |
| Iodine number | 154 | 145 | 133 |

TABLE 12-continued

| | | | | | | |
|---|---|---|---|---|---|---|
| Viscosity in solution cps at 25° C (60 wt % in toluene) | 140 | | 142 | | 184 | |
| Pressure sensitive adhesive properties | | | | | | |
| Natural rubber | X | | X | | X | |
| Block copolymer TR 1107 | | X | | X | | X |
| TR 1102 | | X | | X | | X |
| Resin rubber ratio - phr | 100 | 67/67 | 100 | 67/67 | 100 | 67/67 |
| 180° Peel strength (grams/25 mm) | 590 | 950/135 | 1110 | 2060/598 | 690 | 1315/1210 |
| PolyKen tack (grams) | 50 | 0/0 | 950 | 1350/0 | 400 | 900/0 |
| Tack Rolling Ball method (cm) | >30 | >30/>30 | 8 | 3/>30 | >30 | 15/>30 |
| Shear on paper (hr to failure) | 5 | 150/0 | 3 | >6 weeks/0 | 17 | >6 weeks/>290 |
| Wax cloud point ° C Wax/EVA250/resin wt % 70/15/15 wt % | 135 | | 68 | | 200 | |

What is claimed is:

1. A process for preparing a resin suitable as a tackifier which comprises polymerizing using a Friedel Crafts catalyst:
   (1) a petroleum resin feed comprising $C_5$ olefins and diolefins, $C_6$ olefins and diolefins or a mixture of $C_5$ and $C_6$ olefins and diolefins, said feed being obtained from the cracking of petroleum feedstock, and
   (2) an additive comprising a non-aromatic cyclic compound, said compound being vinyl norbornene or tetrahydroindene.

2. A process according to claim 1 wherein the fractionated feedstock has been subjected to thermal soaking at a temperature of between 100° C. and 160° C.

3. A process according to claim 2 wherein the fractionated feedstock has been subjected to distillation to remove cyclic conjugated diolefins, this distillation taking place after thermal soaking.

4. A process according to claim 1 wherein the amount of additive (2) which is polymerized is between 5 and 50 wt.% based on the weight of petroleum resin feed.

5. A process according to claim 4 wherein the polymerization occurs at a temperature of between 30° C. and 80° C.

6. A process according to claim 1 wherein the polymerization feed also contains styrene, α-methyl styrene, vinyl toluene, indene, a U.O.P. olefin mixture prepared by oligomerisation of propylene with an acidic catalyst, diisobutene or a $C_1$ to $C_{30}$ saturated hydrocarbyl-substituted phenol.

7. A process according to claim 1 wherein the additive (2) also contains a cotrimer of cyclopentadiene or methyl cyclopentadiene with a $C_5$ conjugated diene.

8. A process according to claim 1 wherein the polymerization feed also contains vinyl cyclohexene, dipentene or cyclopentene.

9. A resin prepared by a process which comprises polymerizing using a Friedel Crafts catalyst:
   (1) a petroleum resin feed comprising $C_5$ olefins and diolefins, $C_6$ olefins and diolefins or a mixture of $C_5$ and $C_6$ olefins and diolefins, said feed being obtained from the cracking of petroleum feedstock, and
   (2) an additive comprising a non-aromatic cyclic compound, said compound being vinyl norbornene or tetrahydroindene.

* * * * *